United States Patent [19]

Paist

[11] Patent Number: 4,768,086

[45] Date of Patent: Aug. 30, 1988

[54] COLOR DISPLAY APPARATUS FOR DISPLAYING A MULTI-COLOR VISUAL PATTERN DERIVED FROM TWO AUDIO SIGNALS

[76] Inventor: Roger M. Paist, 11400 - 4th Street N. #606, St. Petersburg, Fla. 33702

[21] Appl. No.: 51,925

[22] Filed: May 19, 1987

Related U.S. Application Data

[63] Continuation of Ser. No. 714,026, Mar. 20, 1985, abandoned.

[51] Int. Cl.⁴ .......................... H04N 9/00; A63J 17/00; G09G 1/28

[52] U.S. Cl. .......................... 358/81; 84/464 R; 340/700; 340/751; 340/815.11; 362/811

[58] Field of Search .......................... 358/81, 82, 93; 84/464 R, 464 A; 40/457; 340/700, 702, 704, 706, 720, 723, 724, 725, 731, 732, 736, 743, 744, 745, 751, 752, 766, 780, 789, 805, 815.11, 815.17, 825.73; 362/811; 381/48

[56] References Cited

U.S. PATENT DOCUMENTS

| | | | |
|---|---|---|---|
| 2,804,500 | 8/1957 | Giacoletto | 381/48 |
| 2,910,681 | 10/1959 | Mita | 84/464 R |
| 3,163,077 | 12/1964 | Shank | 84/464 R |
| 3,476,974 | 11/1969 | Turnage, Jr. et al. | 315/378 |
| 3,604,852 | 9/1971 | Weintraub | 358/82 |
| 3,627,912 | 12/1971 | Hearn | 358/82 |
| 3,662,374 | 5/1972 | Harrison, III et al. | 340/725 |
| 3,668,686 | 6/1972 | Strohmeyer | 340/704 |
| 3,675,231 | 7/1972 | Bezrodny | 340/743 |
| 3,723,652 | 3/1973 | Alles et al. | 381/48 |
| 3,940,789 | 2/1976 | Kratz et al. | 358/82 |
| 3,969,972 | 7/1976 | Bryant | 84/464 R |
| 4,001,880 | 1/1977 | Delikat | 358/81 |
| 4,056,805 | 11/1977 | Brady | 84/464 R |
| 4,068,262 | 1/1978 | Sandler et al. | 358/82 |
| 4,081,829 | 3/1978 | Brown | 358/82 |
| 4,128,846 | 12/1978 | Robinson, Jr. | 358/82 |
| 4,135,203 | 1/1979 | Friedman | 358/81 |
| 4,167,752 | 9/1979 | Liebler et al. | 358/82 |
| 4,168,508 | 9/1979 | Gilbert | 358/82 |
| 4,176,375 | 11/1979 | Scarpelli | 358/82 |
| 4,205,585 | 6/1980 | Hornick | 84/464 R |
| 4,237,482 | 12/1980 | Brentlinger | 358/81 |
| 4,238,827 | 12/1980 | Geary et al. | 364/521 |
| 4,267,561 | 5/1981 | Karpinsky et al. | 358/82 |
| 4,378,466 | 3/1983 | Esser | 340/706 |
| 4,384,286 | 5/1983 | Ditoro | 340/727 |
| 4,394,656 | 7/1983 | Goettsche | 84/464 R |
| 4,614,942 | 9/1986 | Molinaro | 340/815.11 |
| 4,627,092 | 12/1986 | New | 381/48 |

*Primary Examiner*—James J. Groody
*Assistant Examiner*—Randall S. Svihla
*Attorney, Agent, or Firm*—Frijouf, Rust & Pyle

[57] ABSTRACT

An apparatus is disclosed for displaying two-channel audio input signals in a three-color visual pattern. In general, the visual pattern may be formed on a viewing screen by an apparently moving spot having three color components. Phase shifting means is employed to phase shift one of the two audio input signals, and both audio input signals are subsequently processed by low pass filters to produce positioning signals in X-Y coordinates for the spot which forms the visual pattern. In addition, the two audio input signals are also mixed and separately processed by a high pass filter, a band pass filter and a low pass filter to produce frequency separated signals for controlling the intensity of each of three color components of the spot forming the visual pattern. Automatic color balance means utilizing negative feedback is employed to control the amplitude of the separate frequency-discriminated audio signals. In a preferred embodiment, the display unit employs a color cathode ray tube and may comprise equipment of the type normally found in video games or in a color television receiver altered to accept X-Y position and color information.

14 Claims, 2 Drawing Sheets

COLOR DISPLAY APPARATUS FOR DISPLAYING A MULTI-COLOR VISUAL PATTERN DERIVED FROM TWO AUDIO SIGNALS

This is a continuation of application Ser. No. 714,026 filed Mar. 20, 1985, now abandoned.

BACKGROUND OF THE INVENTION

1. Field of the Invention

This invention relates to an apparatus for creating a visual display and more particularly to an apparatus for displaying two-channel audio input signals in a three-color visual pattern.

2. Information Disclosure Statement

Many different systems have been invented for the visual display of sound, particularly where the sound is music. The appeal of the resulting creation is generally enhanced if the visual display is created in color, which generally requires at least three distinct colors. A rudimentary example of this is the colored stage lights popularly used by stage musicians and controlled by foot switches or the like. An early example of a color interpretation system designed primarily for the interpretation of music is illustrated in U.S. Pat. No. 2,804,500 issued to Giacoletto on Aug. 27, 1957. Although it makes use of a three-color cathode ray tube, it essentially discloses only a single audio input separated into three frequency bands by a high pass filter, a low pass filter and a band pass filter, the outputs of which are used to drive directly the three control grids of a color cathode ray tube (CRT) employing deflection circuitry of more conventional means. In an alternative embodiment, three monochrome cathode ray tubes of different colors are driven separately in the manner disclosed by Giacoletto and the results combined optically.

A much more involved visual display system is disclosed by Yoshiharu Mita in U.S. Pat. No. 2,910,681 issued Oct. 27, 1959. This patent stresses manual control of input frequencies to each CRT deflection circuit to create what amounts to an electronic paint brush for an artist. A monochrome CRT is envisioned in this system, and provision is made to augment the manual input with musical input in a limited fashion.

A novel color display apparatus is disclosed by Shank in U.S. Pat. No. 3,163,077 issued Dec. 29, 1964 which involves merely the illumination of incandescent lamps or the like corresponding to musical signals filtered in three separate frequency bands from an audio input signal. Although frequency separation into three distinct channels for a three-color display is disclosed in the Shank patent, the system is strictly limited to what might be termed a three-channel color driver system very similar to a portion of the color driver system disclosed in the Giacoletto patent discussed above. In particular, the Shank patent is completely devoid of any attempt at pattern generation.

U.S. Pat. No. 3,723,652 issued Mar. 27, 1973, to Alles et al. discloses a novel audio-video interface network which accepts audio signals as an input and generates an rf output capable of reception by a standard, unaltered color television receiver. Direct control of the pattern is not attempted in this system however, and the invention also injects additional information on top of the audio input information by virtue of a self-contained pattern generator. It has the advantage, however, of being able to operate with a color television receiver which has not been altered in any way.

Even spoken words may be displayed as color on a television screen through devices such as disclosed in the patent issued to Esser as U.S. Pat. No. 4,378,466 on Mar. 29, 1983. Esser discloses a "visible speech" technique which is useful for persons who are hearing impaired and cannot otherwise sense audio information. Relatively sophisticated triangular filters are involved in this disclosure, but the invention merely relates to the pure translation of intelligence from one form into another for the purpose of communication. No attempt is made at control of the pattern, and no attempt is made to enhance the entertainment value by enhancing the appearance of the visual display.

A variety of other systems are known in the art which have less pertinence to the instant invention. Among these is U.S. Pat. No. 4,205,585 issued to Hornick on June 3, 1980, which discloses an audiovisual conversion system involving a light source such as a laser, the beam of which is deflected by a reflector mounted on a membrane displaced by the audio signal. U.S. Pat. No. 4,384,286 issued to DiToro on May 17, 1983, discloses a high speed graphics display processor. Synthesis of interferograms is disclosed in the Dec. 9, 1980, U.S. Pat. No. 4,238,827 issued to Geary et al. An automatic drawing device for use with a digital computer is disclosed in the patent issued to Bezrodny, U.S. Pat. No. 3,675,231 issued July 4, 1972. U.S. Pat. No. 3,662,374 issued May 9, 1972, to Harrison III, et al. discloses a system for the automatic generation of a visual mouth display in response to sound. Contrasting color display in a cathode ray tube is generally disclosed by the patent issued to Strohmeyer, U.S. Pat. No. 3,668,686 issued June 6, 1972. U.S. Pat. No. 3,476,974 to Turnage, Jr., et al. issued Nov. 4, 1969, discloses digital control of visual display of elliptical patterns.

None of the above-described systems provide a satisfactory combination of both pattern control and color control as is achieved in the invention claimed herein. Although different means of pattern control have been employed as discussed briefly above, no prior method provides means of completely filling the viewing screen with a visual pattern regardless of the type of audio input. Furthermore, the techniques previously used for controlling color are generally of the direct-drive type which can result in a total loss of color in each channel during very quiet passages of the input audio, as well as color saturation in each individual channel when the input audio is at a high level. Even where some degree of automatic control has been attempted in individual color channels, overall balance between three color channels has not been successfully achieved in the past. Therefore, it is an object of this invention to provide an apparatus which overcomes the aforementioned inadequacies of the prior art devices and provides an improvement which is a significant contribution to the advancement of the pertinent art.

Another object of this invention is to provide an apparatus for displaying two-channel audio input signals in a three-color visual pattern formed by a moving spot wherein the apparatus comprises phase shifting means for phase shifting a first audio signal, first filtering means for filtering said first audio signal to produce a first filtered audio signal, second filtering means for filtering a second audio signal to produce a second filtered audio signal, means for controlling the position of the spot as a function of the first and second filtered audio signals, mixing means for mixing said first and second audio signals to produce a mixed audio signal, frequency discrimination means for dividing said mixed audio signal into a high frequency component, a mid-frequency component and a low frequency component, color balance means for controlling the amplitudes of the three frequency-discriminated audio signals, and color driver means driven by said frequency-discriminated audio signals for controlling the intensities of the three color components of the spot.

Another object of this invention is to provide an apparatus for displaying two-channel audio input signals in a three-color visual pattern, wherein said color balance means includes feedback means for summing the three frequency-discriminated audio signals to produce a color balance signal and first, second and third comparator means for controlling the amplitudes of said frequency-discriminated audio signals as a function of said color balance signal.

Another object of this invention is to provide an apparatus for displaying two-channel audio input signals in a three-color visual pattern, including first, second and third detector means for rectifying the outputs of the three frequency discrimination means.

Other objects and a fuller understanding of this invention may be had by referring to the summary of the invention, the description and the claims taken in conjunction with the accompanying drawings.

SUMMARY OF THE INVENTION

The visual display apparatus of the instant invention is intended to be connected between standard sound reproduction apparatus and some type of display unit. In the preferred embodiment, the sound reproduction apparatus is a stereo or even monaural sound system capable of reproducing sound live or from radio, tape, record or the like in electrical form suitable for further processing by the apparatus of the instant invention. The display unit in general may be any device capable of producing a visual image on some type of a viewing screen by an apparently moving spot having three color components. The position of the spot is controlled by a Cartesian coordinate input derived from the visual display apparatus of the instant invention, which also supplies three color signals to control the three color components of the spot which is used to form the visual pattern. Although laser and even liquid crystal displays and the like may be used in such a display unit, the preferred embodiment employs a three-color cathode ray tube (CRT) such as is used in color television receivers and video games. If a color television receiver is used, alteration of the receiver design is required to enable direct control of color intensities and of deflection of the electron beams in the X and Y directions in response to positioning or deflection control signals from the visual display apparatus of the instant invention. Such alterations ultimately may be incorporated in the receivers during the production thereof.

Two audio signals from the sound reproduction apparatus are used as the sole inputs to the visual display apparatus of the instant invention. Typically these two audio inputs are the stereo inputs generally available from stereo sound systems, although a single monaural signal may be used in both input channels as well. After initial processing through an isolation amplifier, the first and second audio signals are conducted into the positioning control channels. The first audio signal is phase shifted by adjustable phase shifting means, whereas the second audio signal is not phase shifted. The second audio signal and the phase shifted first audio signal are then processed through separate low pass filters to produce two filtered audio signals containing only low frequency components. Typically, the cut off frequency for these low pass filters is on the order of 1 kHz, although the filter characteristics are adjustable, and the adjustments are available to the user of the visual display apparatus. The low pass filtering is desirable to remove the high frequency components and thereby provide a relatively smooth visual pattern on the viewing screen. The filtered audio signals are finally passed through final driver amplifiers to provide positioning signals otherwise known as deflection signals for the Cartesian coordinate control of the display unit. Each of the deflection channels has gain control capability available to the user so that, in combination with the phase shifting means, the visual display apparatus may be so adjusted for any given audio input that the entire viewing screen may be filled with the resulting pattern.

The first and second audio signals from the input isolation amplifiers are also passed through variable attenuators and into mixing means to produce a mixed audio signal comprising the desired relative levels of the input audio signals. The mixed audio signal is then presented simultaneously to frequency discrimination means comprising three filter circuits. The first of these filter circuits comprises a high pass filter with the cut off frequency preferably set at approximately 7 kHz. The second filter circuit comprises a band pass filter with cut off frequencies of 1 kHz and 7 kHz in the preferred embodiment. The third filter circuit comprises a low pass filter with a preferred cut off frequency of 1 kHz. The output of each of these three filters is separately detected in diode detector means to provide DC levels responsive to the energy content of the mixed audio signal in each of the three frequency bands separated by the three filters described above. The three DC levels are separately amplified and separately compared with the same feedback signal in separate comparators. The output of these three comparators is then amplified and used to provide a first color signal, a second color signal and a third color signal to control the intensity of the three color components of the apparently moving spot forming the visual pattern on the viewing screen. In the preferred embodiment as noted above, these three color control signals are used to modulate the beam intensities of the three electron beans in a standard color CRT. The separate outputs from the three comparators mentioned above are summed at the negative or inverting input of a feedback amplifier which is a comparator, the positive input of which is referred to an adjustable positive DC level. The output of the feedback amplifier is added to the input of each of the three separate comparators described above to complete the negative feedback loop comprising the color balance means of the instant invention. With this negative feedback circuit, the total color intensity is controlled by the adjustable voltage reference supplied to the positive input of the comparator which functions as the feedback amplifier so that a higher energy content in one of the three frequency-discriminated channels will tend to suppress the signals in the other two channels while maintaining a relatively constant overall signal value. This arrangement produces a large, interesting visual pattern with color emphasis in the visual pattern which corresponds to the energy content of each of the three frequency bands separated by the three filters described above, without over-emphasizing the low frequency content which is otherwise necessarily present in the positioning or deflection circuitry previously described. The resulting combination of color and pattern controlled by the audio input has proven interesting and entertaining to many test subjects who have been used in the development of this system. This color balance means also insures that the visual pattern will never be completely blanked out even during intervals when the input audio is at a low level, and similarly that the visual presentation will never be totally saturated by all three colors simultaneously during a period of exceptionally high signal strength in the input audio signals, thus insuring that at all times there will be a visual pattern present on the viewing screen.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

Similar reference characters refer to similar parts throughout the several views of the drawings.

DETAILED DESCRIPTION OF THE DRAWINGS

Figures 1, 1A, 2:
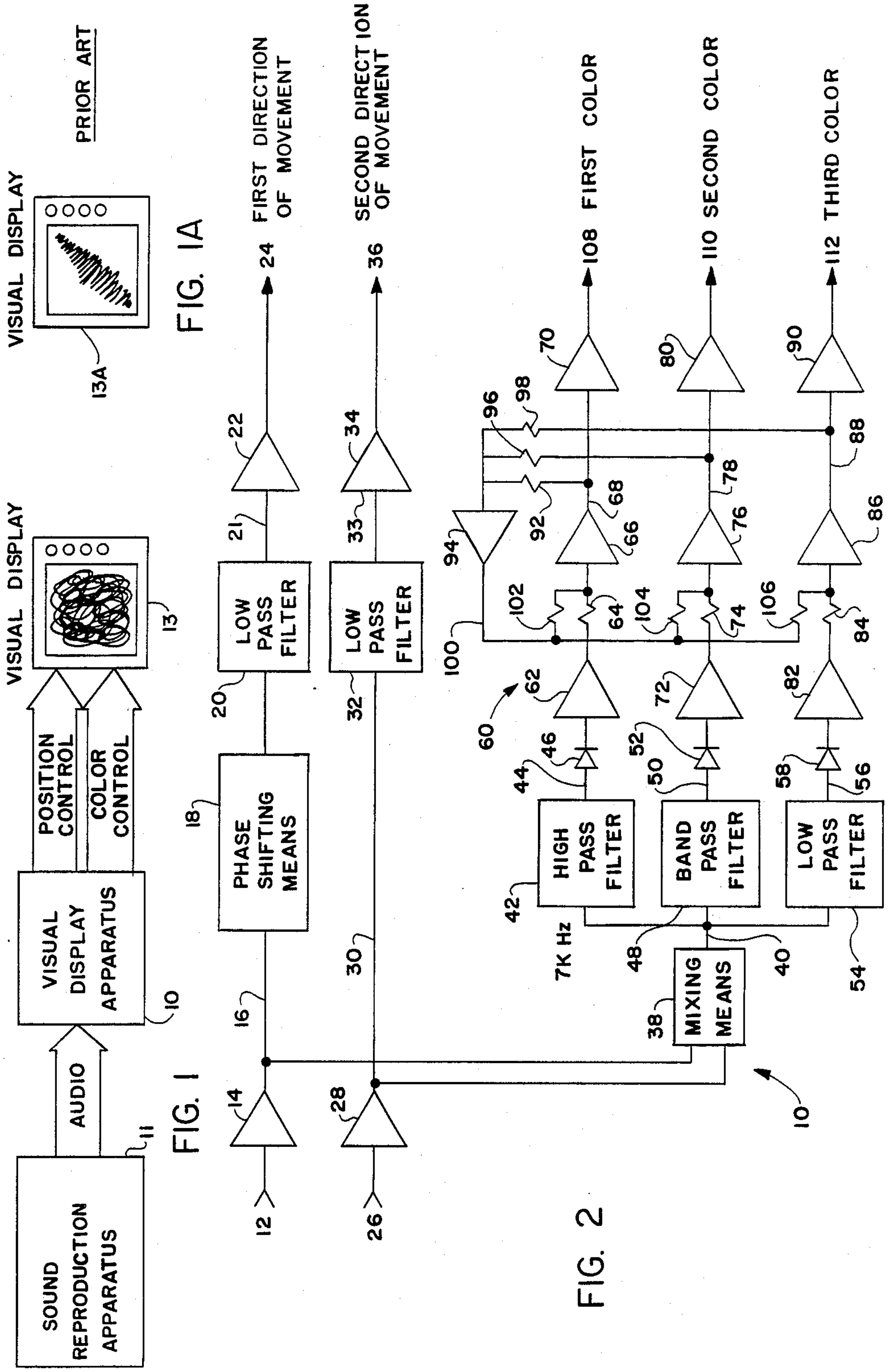
FIG. 1 is a simplified block diagram illustrating the interrelationship between the visual display apparatus of this invention and existing components.
FIG. 1*a* illustrates a visual display apparatus producing a visual pattern typical of prior art devices.
FIG. 2 is a simplified schematic diagram of the visual display apparatus of this invention.

The visual display apparatus 10 of the instant invention is shown in its relationship to related components in FIG. 1. The standard sound reproduction apparatus 11, typically in the form of a stereo sound system, generates signals from a sound source such as a live performance, radio, tape, records or the like. Electrical representations of the sound signals are taken in stereo or even monaural form as an input to the visual display apparatus 10. A display unit 13 is driven by the output of visual display apparatus 10 for creating a visual display as indicated. The output of visual display apparatus 10 is in the form of both position coordinates and color control signals for the display unit 13. The display unit 13 may take various forms, including lasers or a liquid crystal display (LCD) wherein the position of the display spot is controlled by Cartesian coordinate signals, but in the preferred embodiment, a cathode ray tube is used for the display unit 13. In particular, it has been found that a standard television receiver may be altered as is well known in the art to enable the receiver to accept direct control of color intensities and of deflection of the electron beams in accordance with the Cartesian coordinate information supplied by the visual display apparatus 10.

The display unit 13 may also be a color television receiver manufactured with the altered circuits or a special unit similar to those containing color cathode ray tubes which are used in video games. As shown in FIG. 1, the pattern portion of the video display of the instant invention tends to utilize the entire area of the viewing screen of the visual display, whereas prior art devices, as indicated in FIG. 1*a*, tend to create a somewhat monotonous and repetitious pattern often utilizing only a portion of the total viewing area available.

The simplified schematic of the visual display apparatus 10 of the instant invention shown in FIG. 2 depicts a first audio input signal 12 and a second audio input signal 26 as the sole inputs to this apparatus. First audio input signal 12 and second audio input signal 26 are typically available from stereophonic sound reproduction equipment, although it is possible to use a single monaural input in each channel, with some degradation of performance. First audio input signal 12 is connected to the input of isolation amplifier 14 which serves to isolate the remainder of the visual display apparatus from the stereophonic sound reproduction equipment providing the input signals. The output of isolation amplifier 14 is first audio signal 16, which is conducted to the input of phase shifting means 18 to produce a phase shift in first audio signal 16. The output of phase shifting means 18 is conducted to a first filtering means which is preferably a low pass filter 20 to eliminate high frequencies from the first audio signal 16. The output from low pass filter 20 is first filtered audio signal 21 which is used as an input to positioning driver means which, in the preferred embodiment, is deflection driver means comprising deflection driver amplifier 22. The output of deflection driver amplifier 22 is a first deflection signal 24. Second audio input signal 26 is used as the input to isolation amplifier 28, the output of which is second audio signal 30. Unlike the signal processing involved in the first channel as described above, this second audio signal 30 is not phase shifted, but is conducted directly to the input of the second filtering means which in the preferred embodiment comprises low pass filter 32. The output of low pass filter 32 is the second filtered audio signal 33 which is used as an input to positioning driver means comprising deflection driver amplifier 34 in the preferred embodiment. The output of deflection driver amplifier 34 is a second deflection signal 36. First deflection signal 24 and second deflection signal 36 are positioning means or positioning analogs which in general may be used to control the instantaneous Cartesian coordinates of a display spot, the location of which is continuously changed to form the visual pattern in a two-dimensional visual display. Conversion of the two positioning analogs comprising first deflection signal 24 and second deflection signal 36 to polar coordinate positioning analogs is also possible through means well known in the computing art. As described herein, positioning analogs in the form of first deflection signal 24 and second deflection signal 36 are suitable for controlling the position of a display spot in display devices which accept X–Y coordinate inputs, such as laser display devices and liquid crystal display (LCD) units. In the preferred embodiment, first deflection signal 24 and second deflection signal 36 are used to drive the horizontal and vertical deflection circuitry of a cathode ray tube (CRT) such as is used in a common television set.

First audio signal 16 and second audio signal 30 are combined in mixing means 38 to produce a signal output in the form of mixed audio signal 40 which is used as the input to the color control circuitry as described subsequently. Mixed audio signal 40 is conducted to the input of a high pass filter 42 which has a 3 dB cut off frequency of 7 kHz in the preferred embodiment. The output of high pass filter 42 is high frequency audio signal 44 which is connected to detector means 46 comprising a diode in the preferred embodiment. Mixed audio signal 40 is also connected to the input of band pass filter 48 which has a passband between 1 kHz and 7 kHz at the 3 dB points in the preferred embodiment. The output of band pass filter 48 is medium frequency audio signal 50 which is connected to detector means 52 comprising a diode in the preferred embodiment. Mixed audio signal 40 is also connected to the input of low pass filter 54 which has a 3 dB cut off point of 1 kHz. The output of low pass filter 54 is low frequency audio signal 56, which is connected to detector means 58 comprising a diode in the preferred embodiment.

The outputs of detector means 46, 52 and 58 comprise rapidly varying DC levels indicative of the strength of the high frequency audio signal 44, the medium frequency audio signal 50 and the low frequency audio signal 56 respectively. The outputs of detector means 46, 52 and 58 are used as the inputs to the color balance circuit generally denoted 60 in FIG. 2. The output of detector means 46 is connected to amplifier 62, the output of which is conducted through resistor 64 to the input of first amplifier 66. The output of first amplifier 66 is first balanced color signal 68 which is used as an input to amplifier 70, the output of which is first color signal 108. Similarly, the output of detector means 52 is conducted to the input of amplifier 72, the output of which is conducted through resistor 74 to second amplifier 76. The output of second amplifier 76 is second balanced color signal 78, which is used as an input to amplifier 80, the output of which is second color signal 110. In a similar manner, the output of detector means 58 is connected to the input of amplifier 82, the output of which is conducted through resistor 84 to the input of third amplifier 86. The output of third amplifier 86 is third balanced color signal 88, which is used as input to amplifier 90, the output of which is third color signal 112.

First balanced color signal 68, second balanced color signal 78, and third color balanced color signal 88 are respectively connected to the input sides of summing resistors 92, 96 and 98. The outputs of summing resistors 92, 96 and 98 are connected at a common point at the negative input of feedback amplifier 94, the output of which is color balance signal 100. Summing resistor 102 conducts color balance signal 100 to the input of first amplifier 66, while summing resistor 104 conducts color balance signal 100 to the input of second amplifier 76 and summing resistor 106 conducts color balance signal 100 to the input of third amplifier 86. All of the amplifiers indicated in FIG. 2 are non-inverting except for feedback amplifier 94, where the negative input is indicated as shown in FIG. 2. Feedback amplifier 94 uses a negative input in order to develop negative feedback for first amplifier 66, second amplifier 76 and third amplifier 86 to provide the necessary stability and control for the proper operation of color balance circuit 60.

Figure 3:
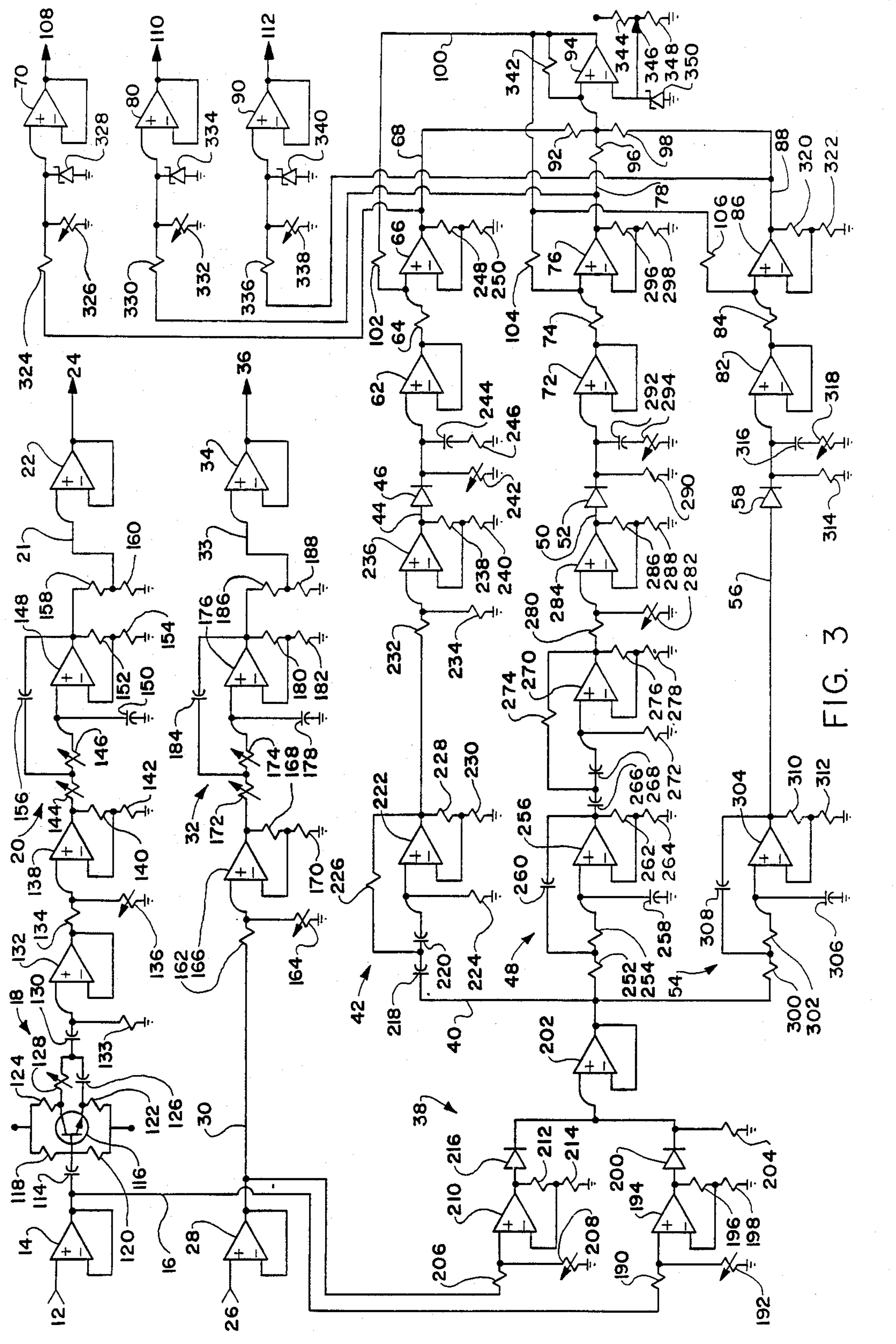
FIG. 3 is a detailed schematic diagram of the visual display apparatus of this invention.

FIG. 3 is a more detailed schematic diagram of the visual display apparatus of the instant invention. As shown in FIG. 3, first audio input signal 12 is conducted to the input of isolation amplifier 14 which employs negative feedback for gain stabilization. The output of isolation amplifier 14 is first audio signal 16, which serves as an input to phase shifting means generally designated as 18 in FIG. 3. First audio signal 16 is conducted through capacitor 114 to the base of transistor 116 in phase shifting means 18. Base bias for transistor 116 is accomplished by connecting the base of transistor 116 through resistor 118 to a +15 VDC source, and also by connecting the base of transistor 116 through resistor 120 to a −15 VDC source. The emitter of transistor 116 is connected through resistor 122 to the −15 VDC source, while the collector of transistor 116 is connected through resistor 124 to the +15 VDC source. The split output from the emitter and collector of transistor 116 is then combined by conducting the emitter signal through capacitor 126 and the collector signal through variable resistor 128 to a common point, and thence through capacitor 130 to the input of amplifier 132 which employs direct negative feedback as shown for gain stabilization. The input of amplifier 132 is connected to ground through resistor 133. A voltage divider comprising the series combination of resistor 134 and variable resistor 136, one side of which is connected to ground, accepts the output of amplifier 132. From the junction of resistor 134 and variable resistor 136 is taken the input to amplifier 138. The output of amplifier 138 is developed across resistors 140 and 142 connected in series between the output of amplifier 138 and ground. Negative feedback for gain stabilization in amplifier 138 is achieved by connecting the junction of resistors 140 and 142 to the negative input of amplifier 138. The output of amplifier 138 is conducted through variable resistor 144 and thence through variable resistor 146 to the positive input of amplifier 148 in the low pass filter generally designated 20 in FIG. 3. Capacitor 150 is connected between the positive input of amplifier 148 and ground. Feedback for gain stabilization is accomplished by developing the output of amplifier 148 across resistors 152 and 154 connected in series to ground, with the junction of resistors 152 and 154 being connected to the negative input of amplifier 148. Signal feedback is accomplished by connecting the output of amplifier 148 through capacitor 156 to the junction of variable resistors 144 and 146 in the input circuit of amplifier 148. The output of amplifier 148 also appears across the voltage divider comprising resistors 158 and 160 connected in series to ground. From the junction of resistors 158 and 160, the attenuated output of amplifier 148 is taken as the first filtered audio signal 21 to the input of deflection driver amplifier 22 which employs direct negative feedback for gain stabilization. The output of deflection driver amplifier 22 is first deflection signal 24 as shown in FIG. 3.

The second audio input signal 26 comprises the input to isolation amplifier 28 which employs direct negative feedback for gain stabilization as shown in FIG. 3. The output of isolation amplifier 28 is second audio signal 30, which is developed across the voltage divider comprising the series combination of resistor 162 and variable resistor 164 connected to ground. The output of that voltage divider is taken from the junction of resistor 162 and variable resistor 164 and conducted to the positive input of amplifier 166. The output of amplifier 166 is developed across the series combination of resistors 168 and 170, one side of which is connected to ground. From the junction of resistors 168 and 170 an attenuated feedback signal is conducted to the negative input of amplifier 166 for gain stabilization. The output of amplifier 166 is conducted through variable resistor 172 and thence through variable resistor 174 to the positive input of amplifier 176 in the low pass filter generally designated 32. Capacitor 178 is connected between the positive input of amplifier 176 and ground. The output of amplifier 176 is developed across the series combination of resistors 180 and 182, the other side of which is connected to ground. From the junction of resistors 180 and 182 an attenuated output signal is taken and connected to the negative input of amplifier 176 for gain stabilization. Signal feedback is accomplished by connecting the output of amplifier 176 through capacitor 184 to the junction of variable resistors 172 and 174 in the input circuit of amplifier 176. The output of amplifier 176 is also developed across a voltage divider comprising the series connection of resistors 186 and 188, the other side of which is connected to ground. From the junction of resistors 186 and 188 is taken the attenuated output from amplifier 176 which comprises second filtered audio signal 33. Second filtered audio signal 33 is used as the input to deflection driver amplifier 34 which employs direct negative feedback for gain stabilization as shown. The output of deflection driver amplifier 34 is the second deflection signal 36 as shown in FIG. 3.

First audio signal 16 and second audio signal 30 are combined within mixing means generally designated 38 in FIG. 3. First audio signal 16 from the output of isolation amplifier 14 is also conducted to the voltage divider comprising the series combination of resistor 190 and variable resistor 192, one side of which is connected to ground. Thus, a signal attenuated from the first audio signal 16 is taken from the junction of resistor 190 and variable resistor 192 and conducted to the positive input of amplifier 194. The output of amplifier 194 is developed across a series combination of fixed resistors 196 and 198, one side of which is connected to ground. From the junction of resistors 196 and 198 a feedback signal is taken to the negative input of amplifier 194 for gain stabilization. The output of amplifier 194 is also connected to the anode of diode 200 prior to actual mixing of signals in mixing means 38. Second audio signal 30 from the output of isolation amplifier 28 is conducted to a voltage divider comprising the series combination of resistor 206 and variable resistor 208, one side of which is connected to ground. Thus an output is taken as an attenuated version of second audio signal 30 from the junction of resistor 206 and variable resistor 208 and conducted to the positive input of amplifier 210. The output of amplifier 210 is developed across the series combination of resistors 212 and 214, one side of which is connected to ground. A feedback signal is taken from the junction of resistors 212 and 214 and conducted to the negative input of amplifier 210. The output of amplifier 210 is also connected to the anode of diode 216 in preparation for signal mixing. The two processed audio signals are mixed by connecting the cathode of diode 200 to the cathode of diode 216. The mixed audio signal is developed across resistor 204, since one side of resistor 204 is connected to the cathodes of diodes 200 and 216 and the other side of resistor 204 is connected to ground. The cathodes of diodes 200 and 216 are also connected to the input of amplifier 202 which employs direct negative feedback for gain stabilization as shown in FIG. 3. The output of amplifier 202 is the mixed audio signal 40.

The output of mixing means 38 is simultaneously processed for frequency discrimination by three separate filtering circuits comprising a high pass filter generally designated 42, a band pass filter generally designated 48, and a low pass filter generally designated 54 in FIG. 3. Mixed audio signal 40 is conducted to the input of the high pass filter generally designated 42 through capacitor 218 and thence through capacitor 220 to the input of amplifier 222. The same input to amplifier 222 is connected to ground through resistor 224. Signal feedback is provided by connecting the output of amplifier 222 through resistor 226 back to the junction of capacitors 218 and 220 in the input circuit to amplifier 222. The output of amplifier 222 is developed across the series combination of resistors 228 and 230, one side of which is connected to ground. A feedback signal is taken from the junction of resistors 228 and 230 and connected to the negative input of amplifier 222 for gain stabilization. The output of amplifier 222 is connected to a voltage divider comprising the series combination of resistors 232 and 234, one side of which is connected to ground. The attenuated output of amplifier 222 is taken from the junction of resistors 232 and 234 and conducted to the input of amplifier 236. The output of amplifier 236 is developed across the series combination of resistors 238 and 240, one side of which is connected to ground. The attenuated feedback signal is taken from the junction of resistors 238 and 240 and connected to the negative input of amplifier 236 for gain stabilization. The output of amplifier 236 is high frequency audio signal 44 as indicated in FIG. 3 and as shown previously in FIG. 2. The anode of diode 46 which functions as a detector is connected to the output of amplifier 236 to detect the high frequency audio signal 44. The detector output is present at the cathode of diode 46 and is developed across resistor 242, one side of which is connected to ground. In parallel with resistor 242 is the series combination of capacitor 244 and variable resistor 246, one side of which is connected to ground. The detected signal at the cathode of diode 46 is connected to the input of amplifier 62, which employs direct negative feedback for gain stabilization. The output of amplifier 62 is conducted through summing resistor 64 to the positive input of first amplifier 66. The output of first amplifier 66 is developed across the series combination of resistors 248 and 250, one side of which is connected to ground. The attenuated output signal at the junction of resistor 248 and 250 is directly fed back to the negative input of first amplifier 66 for gain stabilization.

Mixed audio signal 40 is also connected to the input of the band pass filter generally designated 48 in FIG. 3. Mixed audio signal 40 is conducted through the series combination of resistors 252 and 254 to the positive input of amplifier 256. Capacitor 258 is connected between the positive input of amplifier 256 and ground. Signal feedback is accomplished by connecting the output of amplifier 256 through capacitor 260 back to the junction of resistors 252 and 254 in the input circuit to amplifier 256. The output of amplifier 256 is developed across the series combination of resistors 262 and 264, one side of which is connected to ground. The feedback signal constituting an attenuated version of the output of amplifier 256 is taken from the junction of resistor 262 and 264, and connected to the negative input of amplifier 256. The circuit just described essentially constitutes the low pass filter section of the band pass filter generally designated 48. The output of amplifier 256 is conducted through the series combination of capacitor 266 and then capacitor 268 to the positive input of amplifier 270. Resistor 272 is connected between the positive input of amplifier 270 and ground.

Signal feedback is accomplished by conducting the output of amplifier 270 through resistor 274 back to the junction of capacitors 266 and 268 in the input circuit of amplifier 270. The output of amplifier 270 is developed across a series combination of resistors 276 and 278, one side of which is connected to ground. From the junction of resistors 276 and 278 is taken the feedback signal which is connected to the negative input of amplifier 270 for gain stabilization. The output of amplifier 270 is developed across the voltage divider comprising the series combination of fixed resistor 280 and variable resistor 282, one side of which is connected to ground. From the junction of resistor 280 and variable resistor 282 is taken the input to amplifier 284, the output of which is the medium frequency audio signal 50. The output of amplifier 284 is developed across the series combination of fixed resistors 286 and 288, one side of which is connected to ground. From the junction of resistors 286 and 288, a signal is taken for feedback purposes and conducted to the negative input of amplifier 284 for gain stabilization. Medium frequency audio signal 50 is presented to the anode of a diode which comprises detector means 52. The cathode of the diode comprising detector means 52 is connected to ground through resistor 290. In parallel with resistor 290 is the series combination of capacitor 292 and variable resistor 294, one side of which is connected to ground. The cathode of the diode comprising detector means 52 is connected to the input of amplifier 72 which employs direct negative feedback for gain stabilization. The output of amplifier 72 is conducted through summing resistor 74 to the positive input of second amplifier 76, the output of which is second balanced color signal 78. The output of second amplifier 76 is developed across the series combination of fixed resistors 296 and 298, one side of which is connected to ground. Feedback to the negative input of amplifier 76 for gain stabilization is taken directly from the junction of resistors 296 and 298.

Mixed audio signal 40 is also presented to the input of the low pass filter generally designated 54 in FIG. 3. Mixed audio signal 40 is passed through the series combination of resistors 300 and 302 to the positive input of amplifier 304. Capacitor 306 is connected between the positive input of amplifier 304 and ground. Signal feedback is obtained by connecting the output of amplifier 304 through capacitor 308 to the junction of resistors 300 and 302 in the input circuit of amplifier 304. The output of amplifier 304 is low frequency audio signal 56, which is developed across the series combination of fixed resistors 310 and 312, one side of which is connected to ground. Feedback connected to the negative input of amplifier 304 for gain stabilization is obtained directly from the junction of resistors 310 and 312. Low frequency audio signal 56 is presented to the anode of the diode comprising detector means 58. Resistor 314 is connected to the cathode of the diode comprising detector means 58, and the other side of resistor 314 is connected to ground. In parallel with resistor 314 is the series combination of capacitor 316 and variable resistor 318, one side of which is connected to ground. The detected signal present at the cathode of the diode comprising detector means 58 is conducted directly to the input of amplifier 82 which employs direct negative feedback for gain stabilization as shown in FIG. 3. The output of amplifier 82 is conducted through summing resistor 84 to the positive input of amplifier 86, the output of which is third balanced color signal 88. The output of amplifier 86 is developed across the series combination of fixed resistors 320 and 322, one side of which is connected to ground. Feedback to the negative input of amplifier 86 for gain stabilization is obtained directly from the junction of resistors 320 and 322.

First balanced color signal 68 from the output of first amplifier 66 is conducted through resistor 324 to the input of amplifier 70 which functions as a color driver amplifier. Amplifier 70 employs direct negative feedback for gain stabilization as indicated in FIG. 3. The input of amplifier 70 is connected to ground through variable resistor 326 for intensity control purposes. The cathode of a limiting Zener diode 328 is also connected to the input of amplifier 70, with the anode of Zener diode 328 being connected to ground to prevent color saturation. Similarly, second balanced color signal 78 from the output of second amplifier 76 is conducted directly through resistor 330 to the input of amplifier 80 which functions as a color driver. Amplifier 80 employs direct negative feedback for gain stabilization as indicated in FIG. 3. Also connected to the input of amplifier 80 is variable resistor 332, the other side of which is connected to ground to permit intensity control. To prevent color saturation, Zener diode 334 is also connected between the input of amplifier 80 and ground, the anode of the Zener diode 334 being connected to ground. In a similar manner, third balanced color signal 88 from the output of third amplifier 86 is conducted through resistor 336 to the input of amplifier 90 which functions as another color driver. Amplifier 90 employs direct negative feedback as shown for gain stabilization. Intensity control in this circuit is accomplished by connecting variable resistor 338 between the input of amplifier 90 and ground. As in the previous two color circuits described above, color saturation is prevented by connecting Zener diode 340 between the input of amplifier 90 and ground, the anode of Zener diode 340 being connected to ground.

The automatic color balance provided by this invention is accomplished through an active circuit providing negative feedback in the color control circuits. First balanced color signal 68 from the output of first amplifier 66 is conducted through summing resistor 92 to the negative input of feedback amplifier 94 which functions as a comparator. Similarly, second balanced color signal 78 from the output of second amplifier 76 is conducted through resistor 96 to the negative input of feedback amplifier 94. In a similar manner, third balanced color signal 88 from the output of third amplifier 86 is conducted through resistor 98 to the negative input of feedback amplifier 94. The positive input to the comparator comprising feedback amplifier 94 is derived from a voltage divider which is connected between a positive voltage source and ground. Resistor 344 is connected to a +15 VDC source and to potentiometer 346. The other side of potentiometer 346 is connected to fixed resistor 348, the other side of which is connected to ground. The output from the variable voltage divider thus formed is taken from the wiper of potentiometer 346 and connected directly to the positive input of the comparator comprising feedback amplifier 94. Limiting of the reference signal is accomplished by connecting Zener diode 350 between the positive input of feedback amplifier 94 and ground, with the anode of Zener diode 350 being connected to ground. Feedback for gain stabilization is accomplished in feedback amplifier 94 by conducting the output of feedback amplifier 94 through resistor 342 directly to the negative input of the comparator comprising feedback amplifier 94.

In operation, first audio input signal 12 is phase shifted by phase shifting means 18 as shown in FIG. 3. The signal thus phase shifted is then passed through adjustable low pass filter 20 to produced first filtered audio signal 21. The final output of this channel is obtained by amplifying first filtered audio signal 21 in deflection driver amplifier 22 to provide first deflection signal 24. The handling of second audio input signal 26 is identical except that no phase shifting means is employed. An adjustable low pass filter 32 is similarly employed in this channel to produce second filtered audio signal 33. The output of this channel is second deflection signal 36 which is obtained by amplifying second filtered audio signal 33 in deflection driver amplifier 34. Several adjustments for phase control, amplitude, and filter characteristics are employed as shown to permit the user to adjust the system to his satisfaction. Note that a monaural signal may be used with this system, in which case first audio input signal 12 and second audio input signal 26 will be identical. However, due to the fact that first audio input signal 12 is phase shifted by phase shifting means 18 whereas second audio input signal 26 is not phase shifted, the final outputs of the first deflection signal 24 and second deflection signal 36 will not be in phase. Furthermore, due to the differing adjustments for gain as well as for filter characteristics, the basic information content of first deflection signal 24 and second deflection signal 36 will also differ in virtually all cases. This not only tends to enhance the attractiveness of the visual pattern developed on the viewing screen, but, particularly due to the independent amplitude controls of the two channels coupled with the phase shifting of only one channel, permits the use of essentially the entire screen in a substantially rectangular format.

First audio input signal 12 and second audio input signal 26, after passing through isolation amplifier 14 and isolation amplifier 28 respectively, become first audio signal 16 and second audio signal 30 respectively which are subsequently combined in mixing means 38, the output of which is used as subsequently described in the color control circuitry. First audio signal 16 and second audio signal 30 are conducted into mixing means 38 through attenuators which include variable resistors as shown in FIG. 3. Thus, variable mixing is available to the user of this apparatus. After mixing, the mixed audio signal 40 at the output of amplifier 202 is presented simultaneously to the inputs of high pass filter 42, band pass filter 48, and low pass filter 54. High pass filter 42 preferably employs fixed tuning so that the 3 dB cut off frequency is approximately 7 kHz. The output of high pass filter 42 is high frequency audio signal 44 which is then detected by the diode comprising detector means 46, the output of which is amplified by amplifier 62. Variable resistor 246 is employed in the input circuit to amplifier 62 in order to provide adjustment for the rate of color response in this channel. The output of amplifier 62, after processing through first amplifier 66 is finally amplified by amplifier 70, the output of which is first color signal 108. Mixed audio signal 40 is also presented to the input of the band pass filter 48 as noted above. Band pass filter 48 preferably comprises a low pass section with a 3 dB cut off frequency of approximately 7 kHz followed by a high pass section with a 3 dB cut off frequency of approximately 1 kHz so that the output of band pass filter 48 is medium frequency audio singal 50 having a frequency band extending from 1 kHz to 7 kHz. Medium frequency audio signal 50 is detected by the diode comprising detector means 52 and subsequently amplified by amplifier 72. The input circuit to amplifier 72 contains variable resistor 294 which is used to control the rate of color response in this channel. The output of amplifier 72 is used as an input to second amplifier 76, the output of which is amplified by amplifier 80 to produce second color signal 110 as shown in FIG. 3. Mixed audio signal 40 is also applied to the input of low pass filter 54 which, in the preferred embodiment, employs fixed tuning so that its 3 dB cut off frequency is 1 kHz. The output of low pass filter 54 is low frequency audio signal 56 which is detected by the diode comprising detector means 58. The output of detector means 58 is used as an input amplifier 82 which drives third amplifier 86. The input circuit to amplifier 82 includes variable resistor 318 which is used to control the rate of color response for this low frequency channel. The output of third amplifier 86 is amplified in amplifier 90 to produce third color signal 112 as indicated in FIG. 3.

As shown in FIG. 2, a novel form of color balance means 60 is employed, utilizing feedback amplifier 94, to control automatically the brilliance of the three colors in the display by controlling automatically the amplitudes of first color signal 108, second color signal 110, and third color signal 112 in the preferred embodiment which in the preferred embodiment directly modulate the intensities of the three electron beams found in a standard color cathode ray tube (CRT). Alternatively, the three color signals 108, 110 and 112 may be used to control the intensity of three colors in any visual display system such as a laser system or an LCD system where a moving spot having three-color capability forms a visual pattern on a viewing screen. In the preferred embodiment, first balanced color signal 68 from the output of first amplifier 66 is summed with second balanced color signal 78 from the output of second amplifier 76 and third balanced color signal 88 from the output of third amplifier 86 at the junction of resistors 92, 96 and 98. This junction is also the negative input to feedback amplifier 94. The positive input to feedback amplifier 94 is derived from a voltage divider which includes potentiometer 346 as indicated in FIG. 3. This reference voltage at the positive input to feedback amplifier 94 provides an adjustable reference level for the average gain of all three channels in the color control circuitry. The output of feedback amplifier 94 is employed as negative feedback through summing resistors 102, 104, and 106 respectively as shown into first amplifier 66, second amplifier 76 and third amplifier 86, thus closing the feedback loop. Thus with this configuration, the average signal level present at the negative input of feedback amplifier 94 is always driven toward a value determined by the voltage level present at the output of potentiometer 346. This insures that the colors chosen to represent sounds in the predominating frequency range will tend to be emphasized in the visual display while the other colors are de-emphasized. This type of feedback circuitry avoids the problem experienced in direct color drive from frequency filtering circuits which tends to present in the color display a monotonous component corresponding to the low frequency audio component which is always necessary for deflection of the spot to produce a pleasing pattern. The circuit of the present invention permits the deflection or positioning circuitry to be operated in an optimum configuration to produce the most pleasing pattern results for the user of the equipment, while separate signal processing is employed for the color control utilizing color balance means 60 as described above to permit the desired color response and emphasis corresponding to each of the three audio frequency ranges.

The present disclosure includes that contained in the appended claims as well as that of the foregoing description. Although the invention has been described in its preferred form with a certain degree of particularity, it is understood that the present invention of the preferred form has been made only by way of example, that numerous changes in the details of construction and the combination and arrangement of parts may be resorted to without departing from the spirit and scope of the invention.

What is claimed is:

1. An apparatus for use with a display means for displaying a multi-color visual pattern on a viewing screen, the display means positioning an apparent spot having a first, second and third color component on the viewing screen and with the pattern being derived from a first and a second audio input signal, comprising:

a first input terminal for receiving the first audio input signal;

a second input terminal for receiving the second audio input signal;

first filtering means connected to said first input terminal for filtering the first audio signal to produce a first filtered audio signal;

second filtering means connected to said second input terminal for filtering the second audio signal to produce a second filtered audio signal;

positioning means for controlling the position of the spot in a first and a second direction on the viewing screen;

means connecting said first filtered audio signal of said first filtering means to said positioning means for positioning the spot on the viewing screen in said first direction;

means connecting said second filtered audio signal of said second filtering means to said positioning means for positioning the spot on the viewing screen in said second direction;

first, second and third color driver means for producing a first second and third color driver signal to control the intensity of the first, second and third color component of the spot on the viewing screen, respectively;

means connecting at least one of said first and second terminals to said first, second and third color driver means for controlling the intensity of the first, second and third color component of the spot on the viewing screen in accordance with at least one of said first and said second audio signals;

color intensity control means comprising a comparator;

means for generating a combined driver output signal representing a combination of said first, second and third color driver signals;

said comparator comparing said combined driver output signal and a reference level for providing a comparator output signal in accordance with the difference therebetween; and means for applying said comparator output signal to said first, second and third color driver means for controlling said combined driver output signal to ensure that the magnitude of said combined driver output signal is driven toward said reference level.

2. An apparatus as set forth in claim 1, including phase shift means cooperating with one of said first and second filtering means for providing a phase shift between the first and second audio input signals.

3. An apparatus as set forth in claim 1, wherein said means for generating said combined driver output signal comprises feedback means for feeding back the sum of said first, second and third color driver signals to said first, second and third color driver means.

4. An apparatus as set forth in claim 1, wherein said positioning means comprises a first positioning driver amplifier driven by said first filtered audio signal and a second positioning driver amplifier driven by said second filtered audio signal.

5. An apparatus for use with a display means for displaying a multi-color visual pattern on a viewing screen, the display means positioning an apparent spot having a first, second and third color component on the viewing screen and with the pattern being derived from a first and a second audio input signal, comprising:

a first input terminal for receiving the first audio input signal;

a second input terminal for receiving the second audio input signal;

first filtering means connected to said first input terminal for filtering the first audio signal to produce a first filtered audio signal;

second filtering means connected to said second input terminal for filtering the second audio signal to produce a second filtered audio signal;

positioning means for controlling the position of the spot in a first and a second direction on the viewing screen;

a first positioning driver amplifier receiving said first filtered audio signal for positioning the spot on the viewing screen in said first direction;

a second positioning driver amplifier receiving said second filtered audio signal for positioning the spot on the viewing screen in said second direction;

first color driver means having a first color driver input and first color driver output;

means connecting one of the first and second audio input signals to said first color driver means for producing a first color driver signal at said first color driver output;

means connecting said first color driver output to the display means for enabling said first color driver signal to control the first color component of the spot on the viewing screen;

second color driver means having a second color driver input and second color driver output;

means connecting said one of the first and second audio input signals to said second color driver means for producing a second color driver signal at said second color driver output;

means connecting said second color driver output to the display means for enabling said second color driver signal to control the second color component of the spot on the viewing screen;

third color driver means having a third color driver input and third color driver output;

means connecting said one of the first and second audio input signals to said third color driver means for producing a third color driver signal at said third color driver output;

means connecting said third color driver output to the display means for enabling said third color driver signal to control the third color component of the spot on the viewing screen;

summer means having summer inputs and a summer output;

means connecting said first, second and third color driver outputs to said summer inputs for producing a summer output signal at said summer output representing a sum of said first, second and third color driver signals;

reference means for generating a reference level;

a comparator having comparator input means and comparator output means;

means connecting said summer output and said reference means to said comparator input means for comparing said summer output signal to said reference level and for providing a comparator output representative of the difference between said summer output signal and said reference level; and means connecting said comparator output to said first, second and third color driver inputs for controlling said first, second and third color driver signals to ensure that the sum of said first, second and third color driver signals is driven toward said reference level.

6. An apparatus for use with a cathode ray tube for displaying a multi-color visual pattern on a viewing screen of the cathode ray tube, the cathode ray tube positioning an apparent spot having a first, second and third color component on the viewing screen and with the pattern being derived from a first and a second audio input signal, comprising:

a first input terminal for receiving the first audio input signal;

a second input terminal for receiving the second audio input signal;

first filtering means connected to said first input terminal for filtering the first audio signal to produce a first filtered audio signal;

second filtering means connected to said second input terminal for filtering the second audio signal to produce a second filtered audio signal;

positioning means for controlling the position of the spot in a first and a second direction on the viewing screen;

a first positioning driver amplifier receiving said first filtered audio signal for positioning the spot on the viewing screen in said first direction;

a second positioning driver amplifier receiving said second filtered audio signal for positioning the spot on the viewing screen in said second direction;

first color driver means having a first color driver input and first color driver output;

means connecting one of said first and second audio signals to said first color driver means for producing a first color driver signal at said first color driver output;

means connecting said first color driver output to the cathode ray tube for enabling said first color driver signal to control the first color component of the spot on the viewing screen;

second color driver means having a second color driver input and second color driver output;

means connecting said one of said first and second audio signals to said second color driver means for producing a second color driver signal at said second color driver output;

means connecting said second color driver output to the cathode ray tube for enabling said second color driver signal to control the second color component of the spot on the viewing screen;

third color driver means having a third color driver input and third color driver output;

means connecting said one of said first and second audio signals to said third color driver means for producing a third color driver signal at said third color driver output;

means connecting said third color driver output to the cathode ray tube for enabling said third color driver signal to control the third color component of the spot on the viewing screen;

summer means having summer inputs and a summer output;

means connecting said first, second and third color driver outputs to said summer inputs for producing a summer output signal at said summer output representing a sum of said first, second and third color driver signals;

reference means for generating a reference level;

a comparator having comparator input means and comparator output means;

means connecting said summer output and said reference means to said comparator input means for comparing said summer output signal to said reference level and for providing a comparator output representative of the difference between said summer output signal and said reference level; and means connecting said comparator output to said first, second and third color driver inputs for controlling said first, second and third color driver signals to ensure that the sum of said first, second and third color driver signals is driven toward said reference level.

7. An apparatus for displaying a multi-color visual pattern with the pattern being derived from a first and a second audio input signal, comprising:

a cathode ray tube for displaying an apparent spot on a viewing screen with said apparent spot having a first, second and third color component;

said cathode ray tube having positioning means for controlling the position of said spot in a first and a second direction on said viewing screen;

a first input terminal for receiving the first audio input signal;

a second input terminal for receiving the second audio input signal;

first filtering means connected to said first input terminal for filtering the first audio signal to produce a first filtered audio signal;

second filtering means connected to said second input terminal for filtering the second audio signal to produce a second filtered audio signal;

a first positioning driver amplifier receiving said first filtered audio signal for positioning said spot on said viewing screen in said first direction;

a second positioning driver amplifier receiving said second filtered audio signal for positioning said spot on said viewing screen in said screen direction;

first color driver means having a first color driver input and first color driver output;

means connecting one of said first and second audio signals to said first color driver means for producing a first color driver signal at said first color driver output;

means connecting said first color driver output to said cathode ray tube for enabling said first color driver signal to control said first color component of the spot on said viewing screen;

second color driver means having a second color driver input and second color driver output;

means connecting said one of said first and second audio signals to said second color driver means for producing a second color driver signal at said second color driver output;

means connecting said second color driver output to said cathode ray tube for enabling said second color driver signal to control said second color component of the spot on said viewing screen;

third color driver means having a third color driver input and third color driver output;

means connecting said one of said first and second audio signals to said third color driver means for producing a third color driver signal at said third color driver output;

means connecting said third color driver output to said cathode ray tube for enabling said third color driver signal to control said third color component of the spot on said viewing screen;

summer means having summer inputs and a summer output;

means connecting said first, second and third color driver outputs to said summer inputs for producing a summer output signal at said summer output representing a sum of said first, second and third color driver signals;

reference means for generating a reference level;

a comparator having comparator input means and comparator output means;

means connecting said summer output and said reference means to said comparator input means for comparing said summer output signal to said reference level and for providing a comparator output representative of the difference between said summer output signal and said reference level; and means connecting said comparator output to said first, second and third color driver inputs for controlling said first, second and third color driver signals to ensure that the sum of said first, second and third color driver signals is driven toward said reference level.

8. An apparatus as set forth in claim 6, including phase shift means cooperating with one of said first and second filtering means for providing a phase shift between the first and second audio input signals.

9. An apparatus for use with a display means for displaying a multi-color visual pattern on a viewing screen, the pattern being generated by positioning an apparent spot having a first, second and third color component on the viewing screen and with the pattern being derived from a first and a second audio input signal, comprising:

a first input terminal for receiving the first audio input signal;

a second input terminal for receiving the second audio input signal;

first filtering means connected to said first input terminal for filtering the first audio signal to produce a first filtered audio signal;

second filtering means connected to said second input terminal for filtering the second audio signal to produce a second filtered audio signal;

phase shift means cooperating with one of said first and second filtering means for shifting said first audio input signal relative to said second audio input signal;

a first positioning driver amplifier receiving said first filtered audio signal for positioning the spot on the viewing screen in said first direction;

a second positioning driver amplifier receiving said second filtered audio signal for positioning the spot on the viewing screen in said second direction;

mixing means;

means connecting said first input terminal and said second input terminal to said mixing means to produce a mixed audio signal of said first and said second audio signals;

a high pass filter for transmitting frequencies above a first preselected frequency and for inhibiting the transmission of frequencies below said first preselected frequency to produce a high frequency audio signal from said mixed audio signal;

a band pass filter for transmitting frequencies below said first preselected frequency and above a second preselected frequency and for inhibiting the transmission of frequencies above said first preselected frequency and for inhibiting the transmission of frequencies below said second preselected frequency to produce a medium frequency audio signal from said mixed audio signal;

a low pass filter for transmitting frequencies below said second preselected frequency and for inhibiting the transmission of frequencies above said second preselected frequency to produce a low frequency audio signal from said mixed audio signal;

first color driver means having a first color driver input and first color driver output;

means connecting said high frequency audio signal to said first color driver means for producing a first color driver signal at said first color driver output;

means connecting said first color driver output to the display means for enabling said first color driver signal to control the first color component of the spot on the viewing screen;

second color driver means having a second color driver input and second color driver output;

means connecting said medium frequency audio signal to said second color driver means for producing a second color driver signal at said second color driver output;

means connecting said second color driver output to the display means for enabling said second color driver signal to control the second color component of the spot on the viewing screen;

third color driver means having a third color driver input and third color driver output;

means connecting said low frequency audio signal to said third color driver means for producing a third color driver signal at said third color driver output;

means connecting said third color driver output to the display means for enabling said third color driver signal to control the third color component of the spot on the viewing screen;

summer means having summer inputs and a summer output;

means connecting said first, second and third color driver outputs to said summer inputs for producing a summer output signal at said summer output representing a sum of said first, second and third color driver signals;

reference means for generating a reference level;

a comparator having comparator input means and comparator output means;

means connecting said summer output and said reference means to said comparator input means for comparing said summer output signal to said reference level and for providing a comparator output representative of the difference between said summer output signal and said reference level; and means connecting said comparator output to said first, second and third color driver inputs for controlling said first, second and third color driver signals to ensure that the sum of said first, second and third color driver signals is driven toward said reference level.

10. An apparatus as set forth in claim 9, further comprising a first detector means for rectifying the output of said high pass filter;

a second detector means for rectifying the output of said band pass filter; and a third detector means for rectifying the output of said low pass filter.

11. An apparatus as set forth in claim 9, wherein the cut off frequency of said high pass filter is 7 kHz, the passband of said band pass filter is from 1 kHz to 7 kHz, and the cut off frequency of said low pass filter is 1 kHz, and wherein each of said first and second filtering means comprises a low pass filter having a cut off frequency of 1 kHz.

12. An apparatus for displaying a multi-color visual pattern with the pattern being derived from a first and a second audio input signal, comprising:

a cathode ray tube for displaying an apparent spot on a viewing screen with said apparent spot having a first, second and third color component;

said cathode ray tube having positioning means for controlling the position of said spot in a first and a second direction on said viewing screen;

a first input terminal for receiving the first audio input signal;

a second input terminal for receiving the second audio input signal;

first filtering means connected to said first input terminal for filtering the first audio signal to produce a first filtered audio signal;

second filtering means connected to said second input terminal for filtering the second audio signal to produce a second filtered audio signal;

phase shift means cooperating with one of said first and second filtering means for shifting said first audio input signal relative to said second audio input signal;

a first positioning driver amplifier receiving said first filtered audio signal for positioning the spot on the viewing screen in said first direction;

a second positioning driver amplifier receiving said second filtered audio signal for positioning the spot on the viewing screen in said second direction;

mixing means;

means connecting said first input terminal and said second input terminal to said mixing means to produce a mixed audio signal of said first and said second audio signals;

a high pass filter for transmitting frequencies above a first preselected frequency and for inhibiting the transmission of frequencies below said first preselected frequency to produce a high frequency audio signal from said mixed audio signal;

a band pass filter for transmitting frequencies below said first preselected frequency and above a second preselected frequency and for inhibiting the transmission of frequencies above said first preselected frequency and for inhibiting the transmission of frequencies below said second preselected frequency to produce a medium frequency audio signal from said mixed audio signal;

a low pass filter for transmitting frequencies below said second preselected frequency and for inhibiting the transmission of frequencies above said second preselected frequency to produce a low frequency audio signal from said mixed audio signal;

first color driver means having a first color driver input and first color driver output;

means connecting said high frequency audio signal to said first color driver means for producing a first color driver signal at said first color driver output;

means connecting said first color driver output to the cathode ray tube for enabling said first color driver signal to control the first color component of the spot on the viewing screen;

second color driver means having a second color driver input and second color driver output;

means connecting said medium frequency audio signal to said second color driver means for producing a second color driver signal at said second color driver output;

means connecting said second color driver output to the cathode ray tube for enabling said second color driver signal to control the second color component of the spot on the viewing screen;

third color driver means having a third color driver input and third color driver output;

means connecting said low frequency audio signal to said third color driver means for producing a third color driver signal at said third color driver output;

means connecting said third color driver output to the cathode ray tube for enabling said third color driver signal to control the third color component of the spot on the viewing screen;

summer means having summer inputs and a summer output;

means connecting said first, second and third color driver outputs to said summer inputs for producing a summer output signal at said summer output representing a sum of said first, second and third color driver signals;

reference means for generating a reference level;

a comparator having comparator input means and comparator output means;

means connecting said summer output and said reference means to said comparator input means for comparing said summer output signal to said reference level and for providing a comparator output representative of the difference between said summer output signal and said reference level; and means connecting said comparator output to said first, second and third color driver inputs for controlling said first, second and third color driver signals to ensure that the sum of said first, second and third color driver signals is driven toward said reference level.

13. An apparatus for use with a display means for displaying a multi-color visual pattern on a viewing screen, the display means positioning an apparent spot having a first, second and third color component on the viewing screen and with the pattern being derived from a first and a second audio input signal, comprising:

a first input terminal for receiving the first audio input signal;

a second input terminal for receiving the second audio input signal;

first filtering means connected to said first input terminal for filtering the first audio signal to produce a first filtered audio signal;

second filtering means connected to said second input terminal for filtering the second audio signal to produce a second filtered audio signal;

positioning means for controlling the position of the spot in a first and a second direction on the viewing screen;

means connecting said first filtered audio signal of said first filtering means to said positioning means for positioning the spot on the viewing screen in said first direction;

means connecting said second filtered audio signal of said second filtering means to said positioning means for positioning the spot on the viewing screen in said second direction;

first, second and third color driver means for producing a first second and third color driver signal to control the intensity of the first, second and third color component of the spot on the viewing screen, respectively;

means connecting at least one of said first and second terminals to said first, second and third color driver means for controlling the intensity of the first, second and third color component of the spot on the viewing screen in accordance with at least one of said first and said second audio signals;

color intensity control means comprising a comparator means;

means for generating a combined signal representing a combination of said first, second and third color driver signals;

means for generating a reference signal corresponding to a predetermined voltage level;

said comparator means comparing said combined signal and said reference signal for providing a comparator output signal in accordance with the difference therebetween; and means for applying said comparator output signal for controlling the gains of said first, second and third color driver means to ensure that the combined signal is driven toward the level of said reference signal.

14. An apparatus for use with a display means for displaying a multi-color visual pattern on a viewing screen, the display means positioning an apparent spot having a first, second and third color component on the viewing screen and with the pattern being derived from a first and second audio input signal, comprising:

a first input terminal for receiving the first audio input signal;

a second input terminal for receiving the second audio input signal;

first filtering means connected to said first input terminal for filtering the first audio signal to produce a first filtered audio signal;

second filtering means connected to said second input terminal for filtering the second audio signal to produce a second filtered audio signal;

positioning means for controlling the position of the spot in a first and a second direction on the viewing screen;

a first positioning drive amplifier receiving said first filtered audio signal for positioning the spot on the viewing screen in said first direction;

a second positioning driver amplifier receiving said second filtered audio signal for positioning the spot on the viewing screen in said second direction;

first color driver means having a first color driver input and first color driver output;

means connecting one of the first and second audio input signals to said first color driver means for producing a first color driver signal at said first color driver output;

means connecting said first color driver output to the display means for enabling said first color driver signal to control the first color component of the spot on the viewing screen;

second color driver means having a second color driver input and second color driver output;

means connecting said one of the first and second audio input signals to said second color driver means for producing a second color driver signal at said second color driver output;

means connecting said second color driver output to the display means for enabling said second color driver signal to control the second color component of the spot on the viewing screen;

third color driver means having a third color driver input and third color driver output;

means connecting said one of the first and second audio input signals to said third color driver means for producing a third color driver signal at said third color driver output;

means connecting said third color driver output to the display means for enabling said third color driver signal to control the third color component of the spot on the viewing screen;

combination means having combination inputs and a combination output;

means connecting said first, second and third color driver outputs to said combination inputs for producing a combination output signal at said combination output representing a combination of said first, second and third color driver signals;

reference means for generating a reference level representative of a predetermined voltage level;

comparison means having comparison input means and comparison output means;

means connecting said combination output and said reference means to said comparison input means for comparing said combination output signal to said reference level and for providing a comparison output representative of the difference between said combination output signal and said reference level; and means for connecting said comparison output for controlling the gains of said first, second and third color driver means in a continuous analog manner to ensure that the combination output signal is driven toward said reference level.

* * * * *